United States Patent [19]
Goldfischer

[11] 3,838,424
[45] Sept. 24, 1974

[54] MICROWAVE INTERFERENCE PATTERN SENSOR

[75] Inventor: Lester I. Goldfischer, New Rochelle, N.Y.

[73] Assignee: The Singer Company, Little Falls, N.J.

[22] Filed: Feb. 20, 1973

[21] Appl. No.: 334,011

[52] U.S. Cl. .................................................. 343/8
[51] Int. Cl. .............................................. G01s 9/44
[58] Field of Search ...................................... 343/8

[56] References Cited
UNITED STATES PATENTS
3,143,734  8/1964  Raabe .............................. 343/8 X
3,147,477  9/1964  Dickey ............................... 343/8

Primary Examiner—T. H. Tubbesing
Attorney, Agent, or Firm—T. W. Kennedy

[57] ABSTRACT

A velocity sensing device in which a single radiating horn illuminates a spot on the ground from which power is back scattered to at least a pair of spaced receiving antennas which measure the time required for the back scattered radar speckle pattern developed by the radiation from the horn to traverse the distance between two receiving antennas by determining the frequency at which there is equal power in the sum and difference outputs of a quadratic detector coupled to each antenna, which time is proportional to velocity. Also shown is an arrangement having three antennas which permits measuring velocity in two directions.

12 Claims, 8 Drawing Figures

MICROWAVE INTERFERENCE PATTERN SENSOR

BACKGROUND OF THE INVENTION

This invention relates to velocity sensing in general and more particularly to a radar velocity sensing technique useful in aircraft navigation and the like.

Various systems have been developed in the prior art to sense the velocity of an aircraft or the like as it flies over the ground. The most popular type of system presently in use is the Doppler Navigation System. Another type of system uses the radiation from a laser beam to determine velocity. Such a system is described in U.S. Pat. No. 3,432,237 granted to Flower et al., on Mar. 11, 1969 and assigned to the same assignee as the present invention. Although both of these types of systems work well, each has certain disadvantages. Doppler systems are generally quite complex and costly requiring antennas which can generate a plurality of beams in accurately defined directions, and including hardware to differentiate between returns from the various beams.

Laser systems may require large amounts of high voltage power and may present certain alignment problems. Thus, there is a need for an improved radar type system.

SUMMARY OF THE INVENTION

In the velocity sensing device of the present invention, a single radiating horn illuminates a spot on the ground from which power is backscattered to a pair of spaced receiving antennas. Because of the relative motion between the transmitting antenna and the ground, the backscattered radar speckle pattern which is developed moves as a whole in the opposite direction. The present system makes use of this fact and measures the time required for the pattern to traverse the distance between the two receiving antennas by determining the frequency at which there is equal power in the sum and difference of the outputs of a quadratic detector coupled to each antenna.

An additional antenna making a total of three antennas allows measuring velocity in two directions by tracking the outputs of each of two pairs of the three antennas and providing them to a resolver system.

DESCRIPTION OF THE PREFERRED EMBODIMENT

The radar velocity sensing technique of the present invention operates on the random distribution of backscattered power in space that results when the ground is illuminated by a radar beam. Such distributions are similar to the speckle patterns observed visually when a laser is made to illuminate a diffuse surface. Like its optical counterpart, the radar produced speckle pattern will move as a whole if there is relative motion between the radiating source and the backscattering surface. The basic technique involves measuring the time required for the pattern to traverse a predetermined distance and, from this measurement calculating the velocity of the source.

Figure 1:
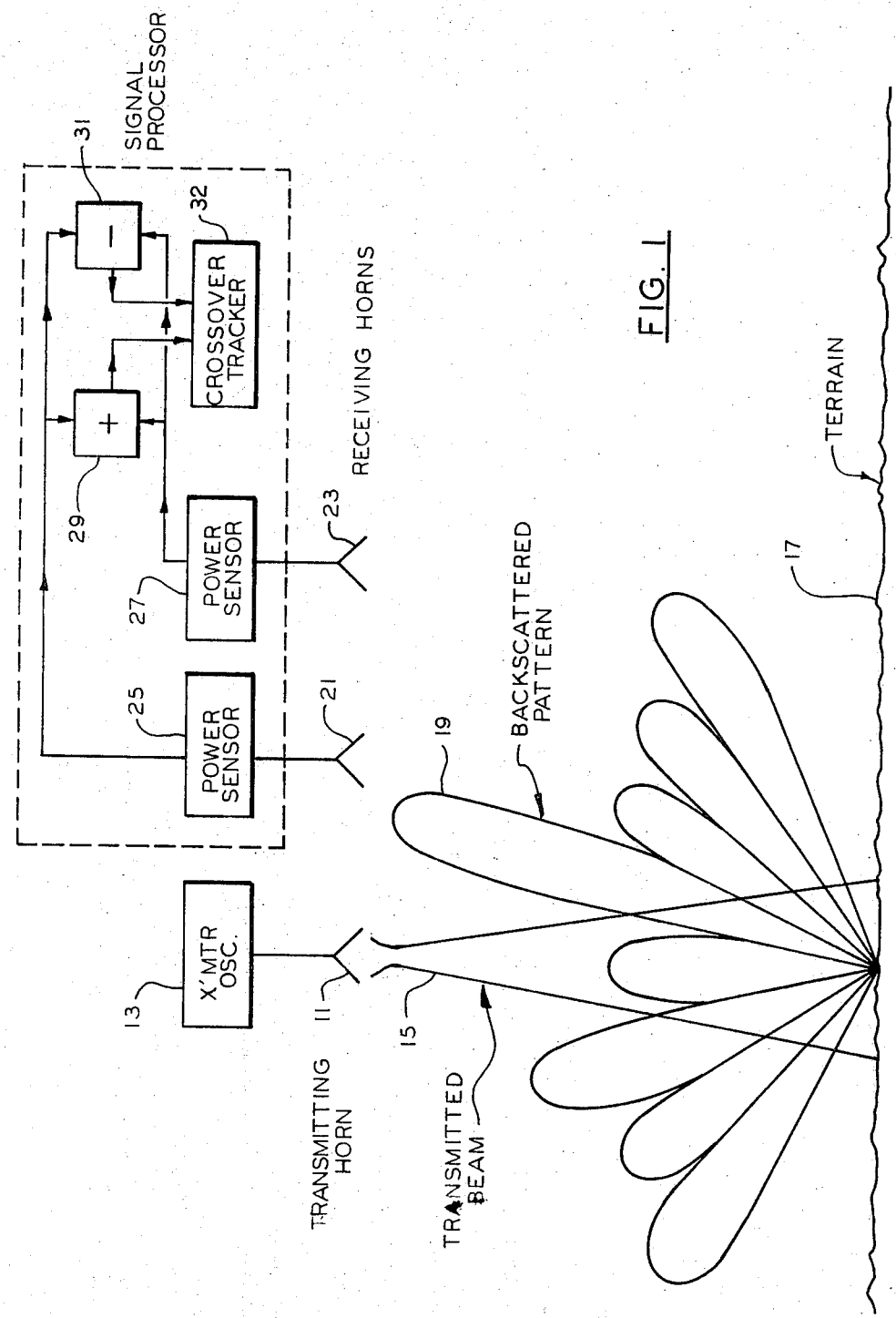
FIG. 1 illustrates the basic elements of the system for one dimensional operation, also showing the nature of the transmitted beam and the backscattered pattern.

In a one dimensional situation, velocity sensing is implemented by means of a single transmitting horn, two receiving horns and a signal processing unit. The axes of all three horns are oriented vertically and the line connecting the two receiving horns, assumed to be identical, is oriented along the velocity vector. A sketch depicting this situation appears in FIG. 1.

The transmitting horn 11 is excited by a source 13 of CW power and radiates a beam 15 toward the terrain 17 below. A portion 19 of this power is scattered back in the direction of the receiving horns 21 and 23. The random nature of the scattering surface causes a density map of the backscattered power to have a speckled appearance. As the vehicle containing the sensor moves in one direction with velocity V, the speckles move in the opposite direction and at the same speed with respect to the ground.

Relative to each of the receiving horns, the speckles move with a velocity of $2V$. Identical power sensors 25 and 27 coupled to the two receiving horns 21 and 23 yield the same waveforms, each being proportional to the same traverse of the speckle pattern of backscattered power. However, assuming that the two receiving horns are separated by a distance $d$ along the line of motion, the two power sensors will develop waveforms which are displaced in time by an amount $\tau$, where $$\tau = d/2V.$$

In this system, velocity is determined from a priori knowledge of $d$ and continuous measurement of $\tau$.

Figure 2:
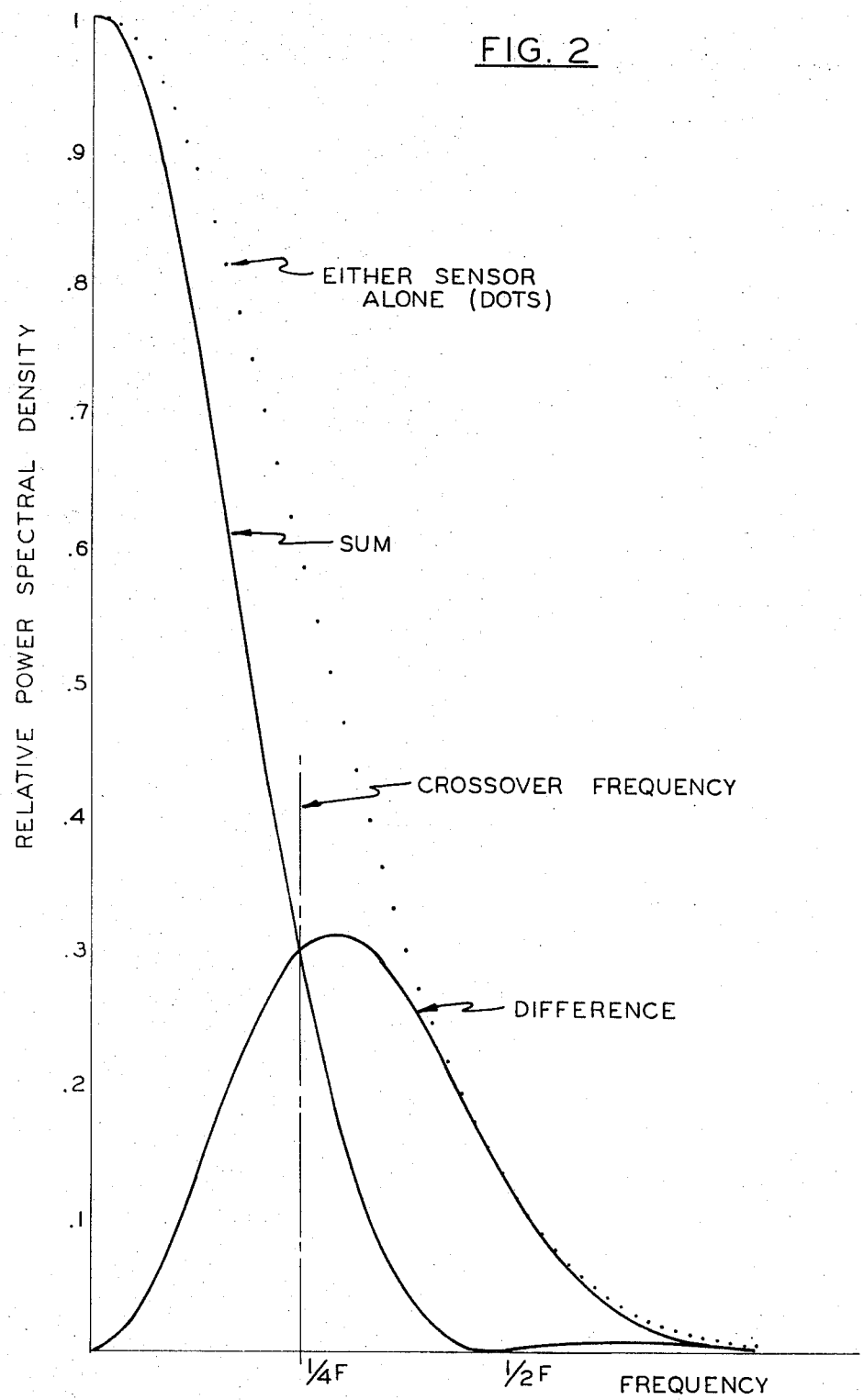
FIG. 2 is a plot of the power density spectra of the received signals from the backscattered pattern and their sums and differences.

As background to the explanation of how $\tau$ is measured, it should be recognized that the complex waveform which appears at the output of each power sensor may be thought of as the result of adding a large number of sinusoids of random phases and different frequencies. A plot of power density per unit frequency would have a form such as shown in FIG. 2. Although the power densities associated with the outputs of the two power sensors are the same, corresponding components at frequency $f$, for example, differ in phase by an amount $\theta$, where $$\theta = 2\pi f \tau.$$

Corresponding (sinusoidal) components of the two power sensor outputs are exactly in phase when $f$ is an integral multiple of $1/\tau$; they are exactly out of phase when $f$ is an odd integral multiple of $1/2\tau$ and they are in quadrature when $f$ is an odd integral multiple of $1/4\tau$.

In the signal processor, the outputs of the power sensors 25 and 27 coupled to the two receiving horns 21 and 23 are summed in a summer 29 and subtracted in a subtractor 31. As a consequence of the phase relationships just described, the power density in the sum channel will show nulls at those frequencies where $2f\tau$ is an even integer whereas the power density of the difference channel will show nulls at those frequencies where $2f\tau$ is an odd integer. In addition - and most important - the power densities of both channels are equal at those frequencies where $2f\tau$ lies halfway between two integers (i.e. is a number ending in 1/2). All of these properties of the sum and difference power densities are depicted in FIG. 2. The essential feature and principal novelty of the signal processor is to measure $\tau$ by determining the lowest crossover frequency, i.e. the lowest frequency for which sum and difference power densities are equal.

Figure 3:
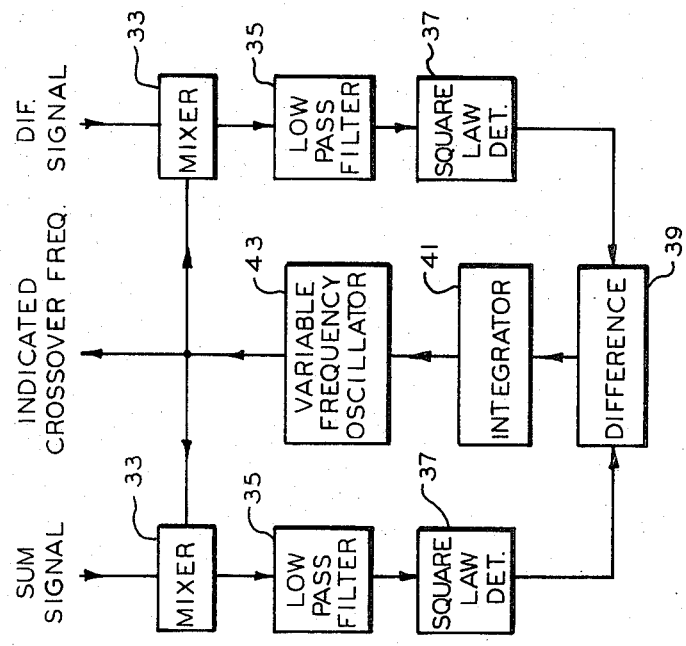
FIG. 3 is a block diagram of the crossover tracker of FIG. 1.

This operation is performed by the closed loop frequency tracker 32 shown on FIG. 3. Here the power density in each channel in the vicinity of the tracking oscillator frequency is sampled by means of a mixer 33, low pass filter 35 and square law detector 37. The outputs of square law detectors 37 are then differenced in block 39. The difference between the DC levels developed at the two detectors is used to drive an integrator 41 whose output controls the frequency of the tracking oscillator 43. Feedback polarities are such as to cause the tracking oscillator to seek and come to rest at the first crossover frequency, i.e. the first point where the sum and difference channels have the same power density. This frequency, $f_c$, is given by the relationship $$f_c = 1/4 \ \tau = V/2d;$$

it is a direct measure of velocity.

Before proceeding to the more complex two dimensional case, a couple of important aspects of the system are worth emphasizing. First, this is not a Doppler technique and the calibration constant is not dependent on either the transmitter frequency or on the antenna patterns. As shown by the equation for $f_c$ above, the calibration constant depends only on the separation, $d$, between the two receiving horns. The second aspect concerns the similarity and differences between this system and CAN (Correlation Aircraft Navigator, devised by GE) or PECAN (Pulse Envelope Correlation Aircraft Navigator, devised by the then Diamond Ordinance Fuze Laboratory). Both in CAN and in PECAN, the delay time $\tau$ is measured directly using a variable delay element (such as a bucket-brigade capacitor chain with variable transfer rate in PECAN and a variable speed magnetic drum in CAN) inside a closed loop cross correlator. In contrast, the present approach is to use a closed loop frequency tracker to establish the crossover frequency of the sum and difference spectra; the delay, $\tau$, is one quarter of the period of this frequency.

Figure 4:
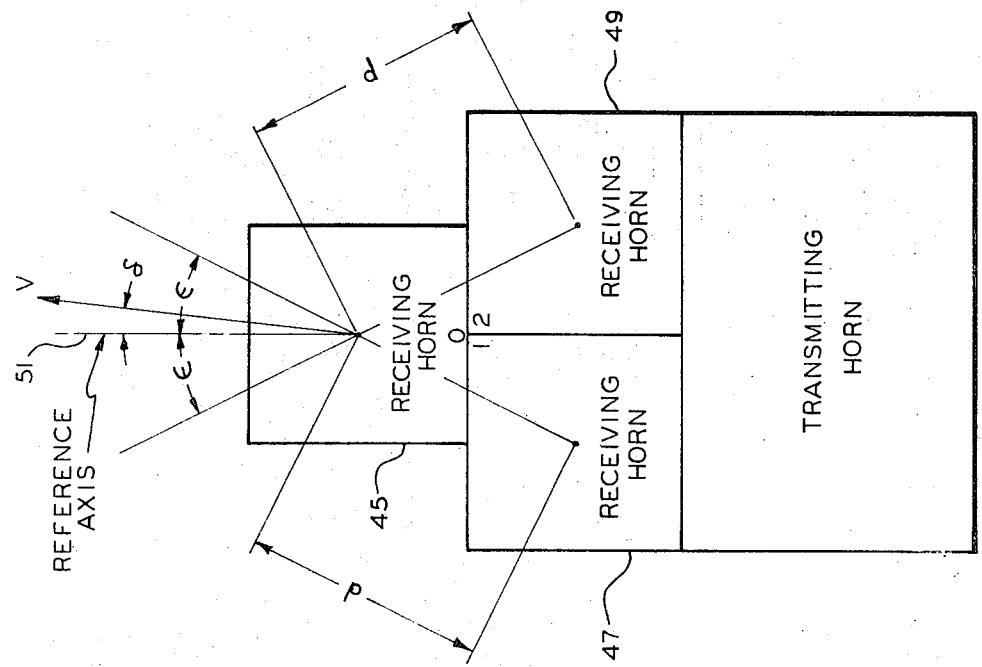
FIG. 4 is a plan view illustrating the antenna geometry for a two dimensional system.

In going from one dimension to two dimensions, it is necessary to increase the number of receiving horns from two to three and, also, to use a sufficiently large transmitting horn. The criterion for the size of the transmitting horn will be discussed subsequently. Here we note that to establish two components of velocity, three receiving horns may be used as two pairs provided the lines connecting their centers are not colinear. A compact and usuable arrangement of receiving horns is shown in FIG. 4. The horns 45 and 47 labeled 0 and 1 form one pair and the horns 45 and 49 labeled 0 and 2 form the other pair. Let the system reference axis 51 be the line bisecting the angle formed by the lines joining the centers of the 01 pair and of the 02 pair of horns. The distance between centers of each pair is assumed to be the same and equal to $d$; the magnitude of the angle between each line of centers and the reference is designated as $\epsilon$. If the velocity vector makes an angle of $\delta$ with respect to the reference direction, as in FIG. 4, then the time delay between corresponding waveforms for each pair is $$\tau_{01} = d \cos (\epsilon + \delta)/2V,$$

$$\tau_{02} = d \cos (\epsilon - \delta)/2V.$$

Note that it is the projection of the distance between the two horns of each pair onto the velocity vector which accounts for the time delay.

In the development of the preceding paragraph, it is implicitly assumed that although the two horns of a given pair do not cross the speckle pattern on precisely the same tracks, the speckles are nonetheless sufficiently large that the resultant waveforms are still essentially the same. From the geometry of FIG. 4, it can be seen that the maximum separation between "tracks" is the distance $d$. Hence, the mean speckle diameter should be greater than $d$; twice this value is a good choice. Previous studies have shown that the mean speckle diameter is approximately the same as the diameter of the transmitting horn. This criterion, then, establishes how large a transmitting horn is needed and led to the relative size depicted in FIG. 4.

One way to resolve the two components of velocity uses the sum and the difference of $\tau_{01}$ and $\tau_{02}$ to get $$\tau_s = \tau_{02} + \tau_{01} = d \cos \epsilon \cos \delta/V,$$

and $$\tau_d = \tau_{02} - \tau_{01} = d \sin \epsilon \sin \delta/V.$$

Since the angle $\epsilon$ is known and constant, the quantity $$R = \quad (\tau_s \sin \epsilon)^2 + (\tau_d \cos \epsilon)^2 = d \sin \epsilon \cos \epsilon/V = d \sin 2\epsilon/2V$$

is inversely proportional to the velocity magnitude. The tangent of the angle $\delta$ is given by $$\tan \delta = \tau_d \cos \epsilon / \tau_s \sin \epsilon.$$

Figure 5:
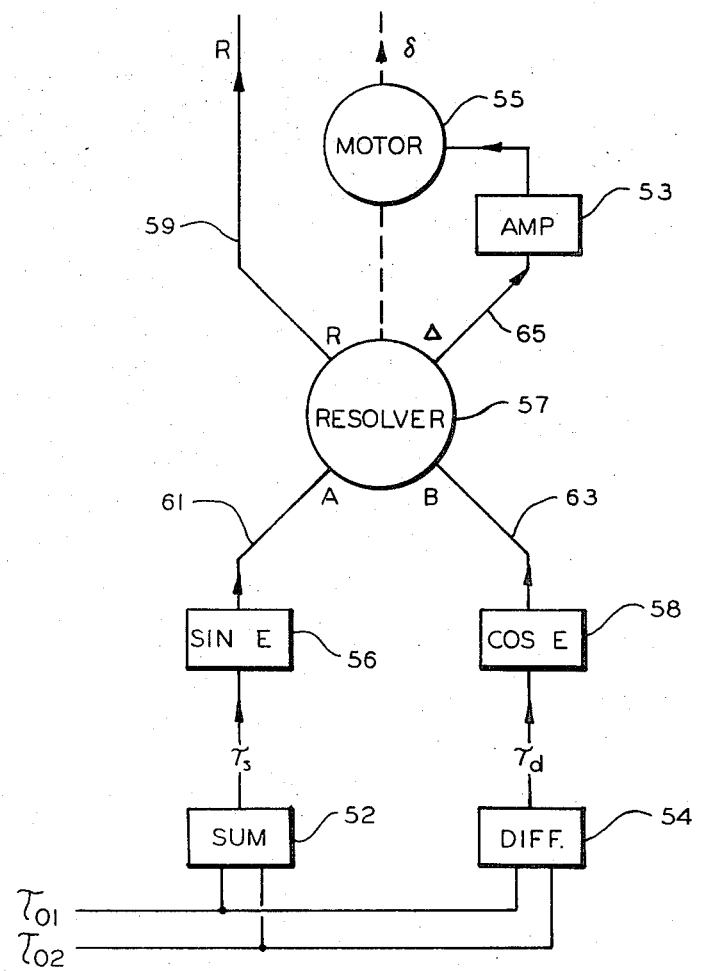
FIG. 5 is a block diagram illustrating the resolver portion of a two dimensional system.

All of these computations may be accomplished by means of the resolver servo (also known as an arctangent solver) which is diagrammed in FIG. 5. The tracker outputs $\tau_{01}$ and $\tau_{02}$ are provided to a summer 52 and a differencing circuit 54 to obtain the $\tau_s$ and $\tau_d$ outputs. The $\tau_s$ output of block 52 is then multiplied by $\sin \epsilon$ in block 56 and the $\tau_d$ output of block 54 multiplied by $\cos \epsilon$ in block 58. In the resolver feedback loop, the servo amplifier 53 energizes the motor 55 on the resolver shaft, causing it to turn until the voltage on the resolver 57 secondary used as the servo input 65 is nulled. At that point, the other resolver secondary winding 59 will have on it the magnitude of the vector whose components are on the two primary windings 61 and 63 while the resolver shaft position will show the angle of that vector.

Although servo means have been described here for the computation of R and $\delta$, these quantities could also have been generated through all electronic means. For example, if $\tau_s \sin \epsilon$ and $\tau_d \cos \epsilon$ had been modulated, respectively, onto two equal amplitude quadrature carriers at the same frequency, the amplitude of the sum of the two modulated signals would be proportional to $R$. This analogue of $R$ and the modulated signal representing $\tau_d \cos \epsilon$ could then be applied to electronic phasemeter circuitry to get the angle $\delta$.

Figure 6:
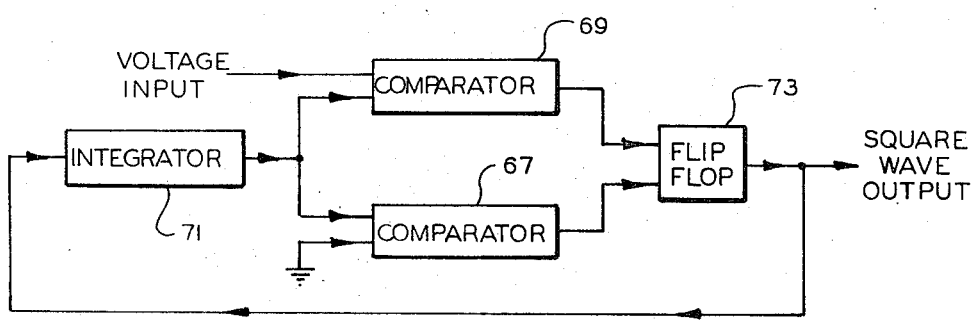
FIG. 6 is a block-circuit diagram of a voltage controlled period generator used in converting a voltage input to a period output.

The quantity $R$, whose computation is described above, has the dimensions of time, i.e., the time required for the speckles to cross the fixed distance $\tau_d \sin 2\epsilon$. In order to develop an output proportional to the velocity magnitude, it is necessary to develop the reciprocal of $R$. This operation is accomplished in a functional block called VCPG (Voltage Controlled Period Generator). One implementation of a VCPG using a flip-flop, an integrator and two comparators is shown in FIG. 6. One comparator 67 is referenced to ground while another comparator 69 is referenced to the input DC level, constraining the output of an integrator 71 providing inputs to both comparators to be a sawtooth wave oscillating between the two reference levels. As each reference level is reached, one of the two comparators switches, setting or resetting a flip-flop 73 and reversing the polarity of its output voltage. The frequency of the flip-flop square wave is inversely proportional to the input DC level. Besides using the VCPG to go from $R$ to a frequency proportional to velocity, the VCPG will also be used in each of the crossover trackers. In these cases, while the tracking loop drives the frequency to the crossover point, the input to the VCPG will be driven to a value proportional to the corresponding time delay.

The details of the "power sensors" which are coupled to the three receiving horns remain to be described. For applications where the transmitting horn is located at a distance from the receiving horns so as that direct leakage is very small and where the altitude is so low that the backscattered energy is well above the noise, the "power sensors" could be simple square law detectors. However, for practical applications, it is highly desirable not to be confined by such constraints. Therefore, in the implementation described here, a superheterodyne receiver is used, both to avoid 1/F noise and to permit bandwidth reduction before power detection, and an LEF (Leakage Elimination Filter) is used to remove any constraints on the location of the transmitting horn. Without the LEF, at elevated altitudes leakage would combine with received RF power to produce erroneous outputs at the power detectors; at the same time, in the absence of the bandwidth reduction described above, additional noise would be present at each power detector output.

Figure 7:
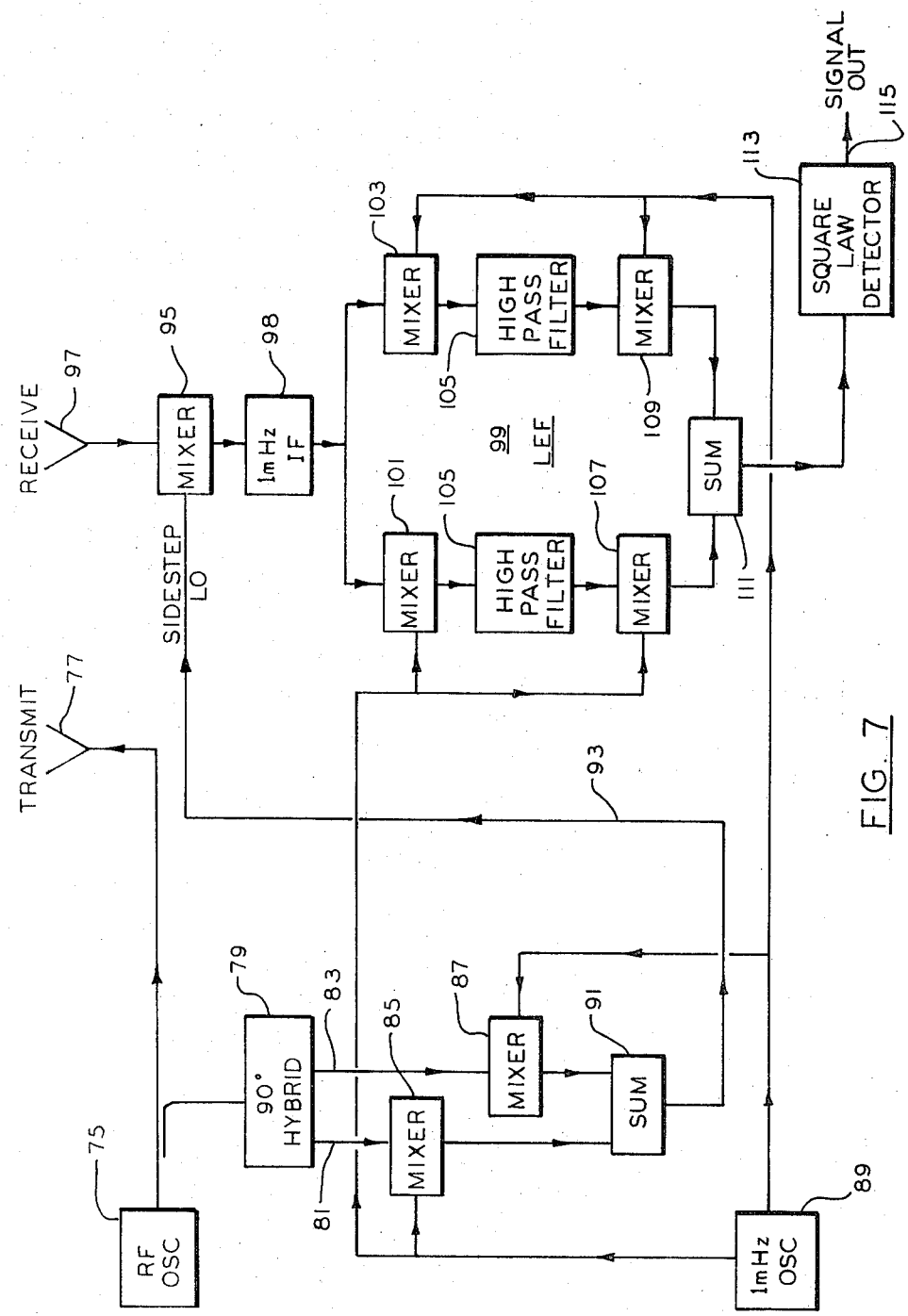
FIG. 7 is a block-circuit diagram of the signal processing of the received signals.

A block diagram showing one receiver channel and the arrangement by which the Local Oscillator (LO) is derived from the transmitter oscillator is given in FIG. 7.

The RF oscillator 75 which provides input energy to the transmitting horn 77 also provides an input to a quadrature circuit 79 which will provide outputs on lines 81 and 83 which are in quadrature. These outputs are provided respectively to mixers 85 and 87 where they are mixed with 1 mHz outputs in quadrature from an oscillator 89. The outputs of mixers 85 and 87 are then summed in summer 91 which provides the sidestepped LO output on line 93. This is used as an input to mixer 95 which is coupled to the receiving horn 97. The output of mixer 95, which will be at the 1 mHz intermediate frequency is then processed in an IF stage 98 and provided to leakage elimination filter (LEF) 99. The output of IF stage 98 is provided to mixers 101 and 103 where it is mixed with respective outputs of the oscillator 89 in quadrature. The outputs of mixers 101 and 103 are provided through identical high pass filters 105 and thence to mixers 107 and 109, where they are again mixed with the quadrature outputs of oscillator 89. The outputs of mixers 107 and 109 are then summed in block 111 and provided to a square law detector 113 which provides the output signal on line 115. Conceptually, the sidestep LO generator and the LEF are quite similar. Both are single sideband generators in which carriers in quadrature are modulated by signals in quadrature. This results in the generation of identical upper and lower sidebands in the two channels except that one set (either uppers or lowers) are in phase while the other set are out of phase. Summing the two channels results in reinforcement of one set and cancellation of the other. The presence of the high pass filters in the LEF after the first mixers removes any energy in the vicinity of the keying signal for those mixers. Hence, the keying signal there must be derived from the same source as is used to achieve sidestep of the LO. However, the use of 1 mHz is not critical; whatever frequency is used, it need only be high enough to avoid 1/F noise in the first IF mixer. The frequency of the keying signal applied to the second set of LEF mixers also need not necessarily be 1 mHz; here the frequency must only be high enough to permit complete unfolding at the second mixer output. The square law detector following the point where the LEF second mixers are summed has an output which is proportional to the power in the speckles of backscattered radiation.

Figure 8:
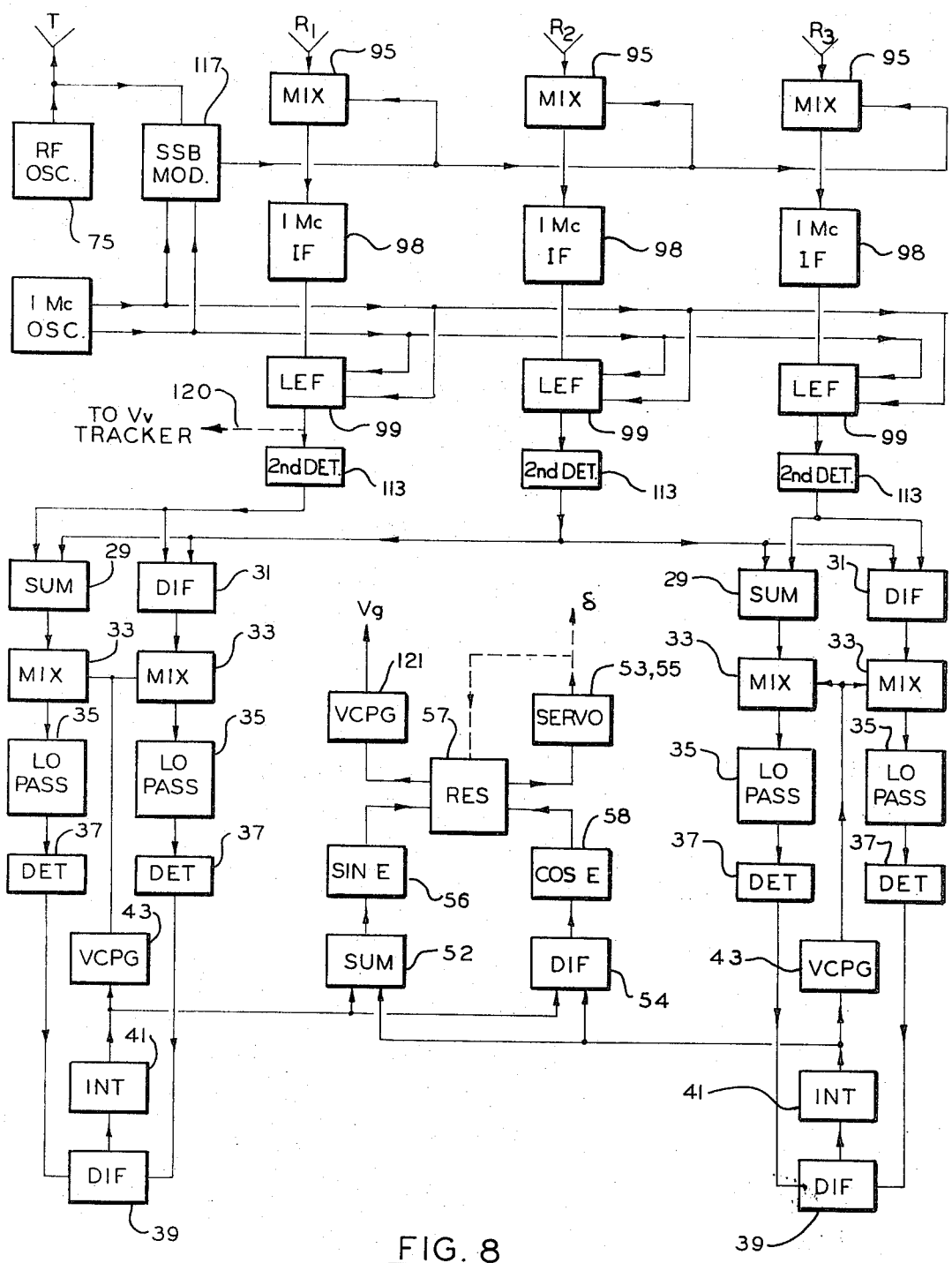
FIG. 8 is a block diagram of the preferred embodiment of the complete system.

The configuration of the complete, two dimensional system is depicted in the block diagram of FIG. 8. Since all the elements have been described in detail above, it is only necessary to remark here on the organization of the diagram. The transmitter 75 and sidestep LO 117 (equivalent to blocks 79, 85, 87, and 91 of FIG. 7) are shown at the top left; the remainder of the top half contains the three receivers each including a mixer 95, IF stage 98, LEF 99 and square law detector 115. At the bottom half, the left and right sides show the two crossover trackers while the center shows the resolver servo and the outputs, $V_g$ and $\delta$. These are the same as the circuits described above in connection with FIGS. 1, 3, 5, and 7 and have been given common reference numerals to those figures. The R output of resolver 57 is provided to a VCPG 121 as described in connection with FIG. 6. It should be noted that the oscillators 43 are also VCPG's constructed in similar manner. Strictly speaking, the quantity denoted by $V_g$ is the projection of the total velocity into the plane defined by the centers of the three receiving horn apertures. However, for the intended application of fixed mounting to aircraft which fly mostly straight and level, $V_g$ is essentially groundspeed (and $\delta$ is drift angle). In the event that measurement of the vertical velocity component is desirable, a coherent signal can be tapped out as indicated by the dashed line 120 in FIG. 8, to be processed in a separate frequency tracker.

To determine what kind of performance might be possible with the present system, an estimate of fluctuation error was made for the following conditions:
transmitter frequency - 13.325 GHz,
transmitting horn - 6 × 6 inches,
receiving horns - 3 × 3 inches,
foreward velocity - 300 knots, vertical velocity - 3600 fpm,
IF bandwidth - 15 kHz,
altitude - 20,000 feet,
assumed scattering loss over land - 14 dB,
receiver noise figure - 10 dB.

It turned out that by using tracking filters (i.e. the low pass filters following the mixers in each crossover tracker) whose bandwidth was between 25 to 45 percent of the crossover frequency, a minimum fluctuation error of 0.16 percent rms - averaged over 10 nm - could be achieved using a transmitted power level of only 8.1 mw. For these calculations, the receiving horns were arranged as shown in FIG. 4 and zero drift was assumed.

It should be noted that for the dimensions of the transmitting horn and the value of transmitting frequency given, the beamwidth is approximately 10°. Since the scattering loss near vertical incidence is generally less over water than over land and since, even down to a Campbell 1 sea-state, the loss varies by less than 3 dB for deviations of less than 7° from the vertical, it may be expected that straight and level flight over water will result in essentially the same performance as over land but with somewhat less fluctuation error if water motion effects are excluded.

However, this over water behavior will not be duplicated at all transmitter frequencies. For fixed transmitting horn dimensions, as the transmitter frequency is reduced, the transmitter beamwidth increases. Below some value of transmitter frequency and at a particular altitude and sea-state, the size of backscattering area on the water will be fixed by the shape of the overwater backscattering curve rather than the transmitter beamwidth. For example, with a Campbell 1 sea-state, the diameter of the effective backscattering area would subtend an angle of 14° at the transmitting horn even though the effective beamwidth were larger than this. Under these conditions, the mean speckle diameter at the rceiving horns becomes larger than normal and the bandwidth of the power spectral density of the received signal shrinks. The net result of these effects is a descrease in signal to noise ratio with a consequent increase in fluctuation error and a tendency toward an overwater bias shift; the indicated velocity would tend to be higher than over land. As with the crossover tracker employed with lobed Doppler systems, the bias error varies with the ratio of the tracking filter bandwidth to the signal spectrum bandwidth. Therefore, it may in principle be reduced to as small an amount as desired; in practice it could be kept quite small.

All of the foregoing discussion is related to a CW system. Lest the wrong impression be given, it is here stated that a pulsed version can also be synthesized. Such a pulsed system would either be combined integrally with a pulsed altimeter or be an add-on feature for a pulsed altimeter already in existence. The attractiveness of such a combination is marred by the need for a wideband IF with a pulsed transmission format. To avoid the additional noise present in this extra bandwidth, the IF would be gated off (by the range gate in an integral combination or by a pseudo-range gate generated from the altimeter readout in an add-on unit) between received pulses. Otherwise, the use of square law power detectors after the IF and all of the rest of the signal processing circuitry would be the same as described for the CW version.

Thus, a system which employs a new technique for velocity sensing has been shown. When implemented in a CW version, it can be realized with an extremely simple and8c inexpensive set of antennas, four rectangular horns, and a straightforward signal processor. It can also be implemented in a pulsed version, either in direct combination perpendicular or as an add-on unit for a pulsed altimeter. In the latter case, only the receiving horns would have to be provided. Although a specific embodiment has been shown and described it will be obvious to those skilled in the art that various modifications may be made without departing from the spirit of the invention which is intended to be limited solely by the appended claims.

What is claimed is:
1. Velocity sensing apparatus comprising:
  a. means to illuminate an area on the ground with radar energy;
  b. at least two receiving antennas spaced in the direction in which velocity is to be sensed;
  c. means to measure the time required for the backscattered radar energy to transverse the distance between the two antennas whereby from said time, velocity may be determined said means comprising:
  d. a first power sensor coupled to one receiving antenna;
  e. a second power sensor coupled to the other receiving antenna;
  f. first means to sum the outputs of said first and second power sensors;
  g. first means to difference the outputs of said first and second power sensors; and
  h. first means to track the cross over of the sum and difference outputs obtained from said summing and differencing means.

2. The invention according to claim 1 wherein said tracking means comprise:
  a. a variable frequency oscillator;
  b. a first mixer having as inputs the output of said oscillator and the output of said summing means;
  c. a second mixer having as inputs the output of said oscillator and the output of said differencing means;
  d. a first square law detector;
  e. a second square law detector;
  f. a first low pass filter coupling the output of said first mixer to said first square law detector;
  g. a second low pass filter coupling the output of said second mixer to said second square law detector; and
  h. second differencing means having as inputs the outputs of said first and second square law detectors and providing its output as a control input to said variable frequency oscillator whereby the oscillator frequency will be the crossover frequency of the sum and difference signals.

3. The invention according to claim 2 wherein three receiving antennas are provided with first and second antennas placed side by side along a direction prependicular to that along which velocity is to be measured and a third spaced from said first and second along the direction of velocity measurement with its center equal distance from the centers of said first and second antennas and wherein said first and second power sensors are coupled to said first and third antennas and further including:

a. a third power sensor coupled to said second antenna;
b. second means to sum the outputs of said third and second power sensors;
c. third means to difference the outputs of said third and second power sensors;
d. second tracking means identical to said first tracking means to track the crossover of the sum and difference outputs from said second summing and differencing means; and
e. means having as inputs the outputs of said first and second tracker to resolve said outputs to provide an output indicative of the time to traverse the distance from a line connecting the centers of said first and second antennas to the center of said third antenna and a drift angle representing the angle which the velocity vectors makes with a line along said distance.

4. The invention according to claim 3 wherein said resolving means comprise:
a. third means to sum the outputs of said first and second trackers;
b. fourth means to difference the outputs of said first and second trackers;
c. first means to multiply the output of said third summing means by sin $\epsilon$ where $\epsilon$ is the angle which a line from the center of said first to the center of said third antenna make with a line from the center of said third antenna perpendicular to a line passing through the centers of the first and second antennas;
d. second means to multiply the output of said differencing means by cos $\epsilon$;
e. a resolver having the outputs of said first and second means as primary inputs; and
f. a servo system including an amplifier and a motor said motor coupled to the shaft of said resolver and said system obtaining its error input from one secondary winding of said resolver and adapted to position said resolver shaft to null out said error whereby the output of the second secondary winding of said resolver will represent said time and said resolver shaft angle will represent said drift angle.

5. The invention according to claim 4 and further including means to convert said time output to an output representative of velocity.

6. The invention according to claim 5 wherein said means to convert is a voltage controlled period generator.

7. The invention according to claim 6 wherein said first and second variable frequency oscillators are voltage controlled period generators.

8. The invention according to claim 7 wherein each of said voltage controlled period generators comprise:

a. a first comparator referenced to ground;
b. a second comparator referenced to the input to said generator;
c. a flip flop having its set and reset inputs coupled respectively to the outputs of said first and second comparators and
d. an integrator having an input from the output of said flip flop and providing its output as second inputs to said first and second comparators.

9. The invention according to claim 4 wherein each of said first, second, third and fourth power sensors comprise:
a. means to generate a sidestep local oscillator (LD) signal from the transmitted signal;
b. a third mixer to mix said LO signal with the receiving antenna input; and
c. a third square law detector coupled to said mixer and providing the final signal output.

10. The invention according to claim 9 and further including a leakage elimination filter (LEF) between said mixer and said third square law detector.

11. The invention according to claim 10 wherein said LO means comprise:
a. a quadrature circuit having an input from the transmitter and providing first and second outputs in quadrature.
b. an intermediate frequency (IF) oscillator providing first and second outputs in quadrature;
c. a fourth mixer having as inputs said first quadrature circuit output and said first IF oscillator output;
d. a fifth mixer having as inputs said second quadrature circuit output and said second IF oscillator output, and
e. fourth means to sum the outputs of said fourth and fifth mixers.

12. The invention according to claim 11 wherein said LEF comprises:
a. a sixth mixer having as inputs the output of third mixer and said first IF oscillator output;
b. a seventh mixer having as inputs the output of said third mixer and said second IF oscillator output;
c. a first high pass filter obtaining its input from said sixth mixer;
d. a second high pass filter obtaining its input from said seventh mixer;
e. an eighth mixer having as inputs the output of said first high pass filter and said first IF oscillator output;
f. a ninth mixer having as inputs the output of said second high pass filter and said second IF oscillator output and,
g. fifth means to sum the outputs of said eighth and ninth mixers.

* * * * *